(12) United States Patent
Morikawa et al.

(10) Patent No.: US 7,880,758 B2
(45) Date of Patent: *Feb. 1, 2011

(54) IMAGE FORMING APPARATUS

(75) Inventors: Minoru Morikawa, Kanagwa (JP);
Shinichi Suzuki, Kanagwa (JP);
Kazumi Ishima, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,853

(22) Filed: Aug. 14, 2008

(65) Prior Publication Data

US 2009/0046137 A1 Feb. 19, 2009

Related U.S. Application Data

(63) Continuation of application No. 11/625,593, filed on Jan. 22, 2007, now Pat. No. 7,432,946.

(30) Foreign Application Priority Data

Jan. 27, 2006 (JP) ............... 2006-019530
Nov. 10, 2006 (JP) ............... 2006-305389

(51) Int. Cl.
*B41J 2/45* (2006.01)
*B41J 2/455* (2006.01)
*G02B 26/10* (2006.01)

(52) U.S. Cl. ................... 347/238; 347/245

(58) Field of Classification Search ............ 347/129, 347/130, 134, 137, 138, 233, 238, 245, 263
See application file for complete search history.

(56) References Cited

U.S. PATENT DOCUMENTS

| 4,776,683 | A | 10/1988 | Maeda et al. |
| 5,999,345 | A | 12/1999 | Nakajima et al. |
| 6,283,373 | B1 | 9/2001 | Ohkawa et al. |
| 6,343,092 | B1 | 1/2002 | Naoe et al. |
| 6,840,452 | B2 | 1/2005 | Ohkawa et al. |
| 7,432,946 | B2 * | 10/2008 | Morikawa et al. ........... 347/238 |

FOREIGN PATENT DOCUMENTS

JP          2005-317925        11/2005

OTHER PUBLICATIONS

Computer-generated translation of JP 2005-317925 cited in the IDS filed on Jan. 22, 2007.

* cited by examiner

*Primary Examiner*—Huan H Tran
(74) *Attorney, Agent, or Firm*—Oblon, Spivak, McClelland, Maier & Neustadt, L.L.P.

(57) ABSTRACT

Described herein is a light source apparatus in which wasteful cost increases can be suppressed during the manufacture of various types of light source apparatuses and replacement of a broken light source can be performed at low cost, a recording apparatus using the light source apparatus, and an image forming apparatus comprising the recording apparatus, a plurality of optical units comprising optical members (a light source element and a lens) for outputting a single beam are combined separably in row form, and a holder used as means for holding the optical units in row form.

10 Claims, 19 Drawing Sheets

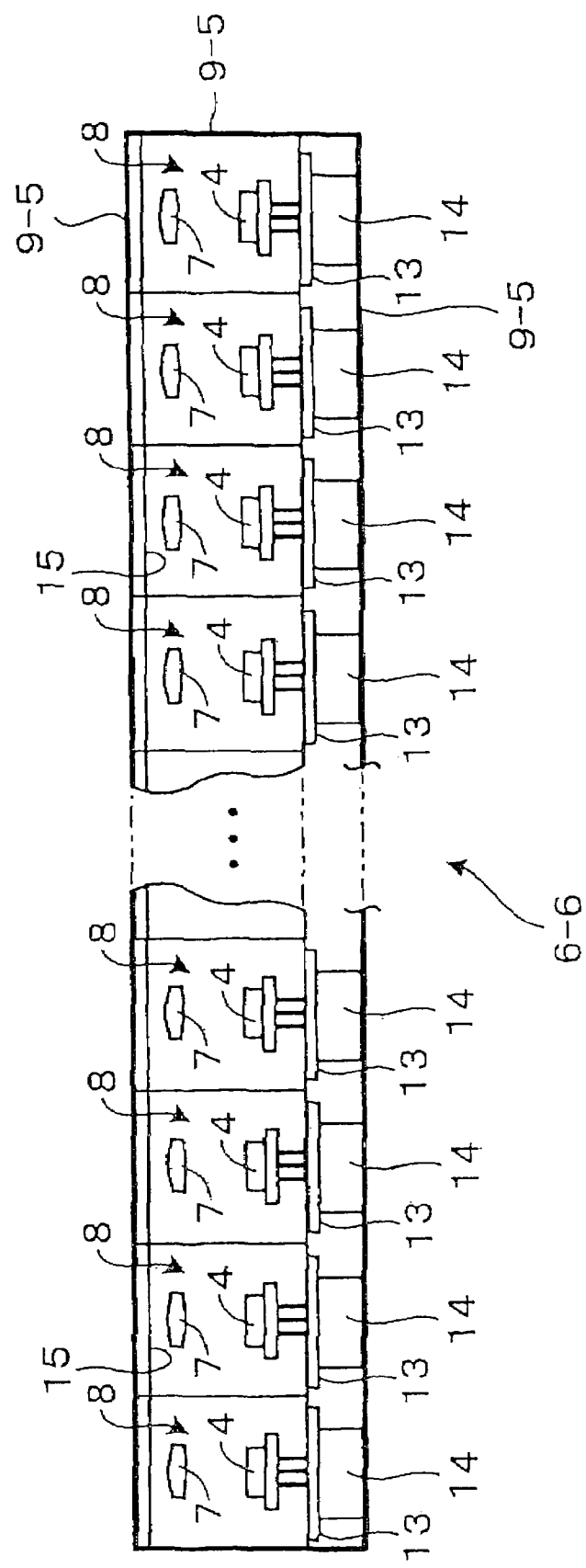

IMAGE FORMING APPARATUS

CROSS-REFERENCE TO RELATED APPLICATIONS

This application is a continuation Application of, and claims the benefit of priority under 35 U.S.C. §120 from, U.S. application Ser. No. 11/625,593, filed Jan. 22, 2007 now U.S. Pat. No. 7,432,946, which claims the benefit of priority under 35 U.S.C. §119 from Japanese Patent Application Nos. 2006-019530, filed Jan. 27, 2006 and 2006-305389, filed Nov. 10, 2006.

BACKGROUND OF THE INVENTION

1. Field of the Invention

The present invention relates to a light source apparatus that emits a plurality of beams, a recording apparatus installed with the light source apparatus, and an image forming apparatus installed with the recording apparatus, these apparatuses being applicable to an image setter or plotter apparatus for use in various types of plate making such as CTP (Computer to Plate), and for creating art work film or mask film and printed circuit boards, an image forming apparatus using silver salt as a medium, a DI (Direct Imaging) machine, an electrophotographic apparatus, a printer, a copier, a plate making apparatus, a printing machine having a plate making function, and so on.

2. Description of the Background Art

A light source apparatus comprising a plurality of anode common light source elements (laser diodes, for example), lenses corresponding to each light source element, one or a plurality of insulators for holding the light source elements, a metal bracket for holding the insulator, and a circuit board to which terminals of the respective light source elements, which are fixed to the metal bracket, are connected, is disclosed in paragraph 0079, FIG. 19, and soon of Japanese Unexamined Patent Application Publication 2005-317925, for example. In this light source apparatus, when a set of components comprising a light source element for outputting a single beam, a lens, an insulator, a terminal, and soon is referred to as an optical member, a plurality of optical members are formed on the circuit board, and by varying the number and arrangement of the circuit boards, a light source apparatus for use in numerous applications, image writing in many lengths, and so on can be provided.

Hence, in a conventional light source apparatus, a plurality of optical members are divided among and arranged on a plurality of circuit boards, and by varying the number of circuit boards, it is possible to manufacture light source apparatuses in many lengths. Further, broken light sources can be replaced in circuit board units, enabling a reduction in maintenance costs. Thus, a conventional light source apparatus exhibits various possibilities.

In actuality, however, it has been learned that the number of beams must be varied in single beam units. The background to this is demand for light source apparatus structures of many lengths and improvements in maintenance ease. Demand for reductions in initial cost and maintenance cost must also be satisfied. For example, conventionally, a single circuit board can carry a large number of light sources, and hence it is difficult to use the circuit board effectively when light source apparatuses having different numbers of light sources are manufactured.

For example, when manufacturing a light source apparatus comprising 84 light sources using a circuit board that carries 36 light sources, three circuit boards must be used, with the result that 108 light sources are provided. However, the number of light sources in actual use is 84, and therefore substrate costs are used wastefully. When a large number of light sources are fixed directly to the circuit board (in the aforementioned publication, caulking is recommended), for example when a single board is capable of carrying 36 light sources, as in the example described above, and a single light source breaks, the remaining 35 usable light sources must be replaced together with the board, and therefore the cost of replacement components is particularly high.

When studying the background art in view of the problems described above, according to which a conventional apparatus must be manufactured in unnecessary beam number units or a circuit board carrying a plurality of light sources must be replaced, it is evident that conventional apparatuses are extremely wasteful.

SUMMARY OF THE INVENTION

The present invention has been designed in consideration of these problems, and it is an object thereof to suppress wasteful cost increases when manufacturing various types of light source apparatuses, and to provide a light source apparatus having a high-precision constitution with which a broken light source can be replaced at low cost, and an image forming apparatus capable of high image quality recording.

In an aspect of the present invention, an image forming apparatus uses an optical unit array formed by arranging a plurality of optical units. Each of the units is formed by incorporating a light source element and a lens for condensing light from the light source element into a casing, and performs image formation in an image formation area using energy from the light source element by apportioning the image formation area among the optical units. The optical unit array comprises gaps between the casings of adjacent optical units, and is installed in a holding member such that the optical units can be attached and detached.

In another aspect of the present invention, an image forming apparatus uses an optical unit array formed by arranging a plurality of optical units. Each of the units is formed by incorporating a light source element and a lens for condensing light from the light source element into a casing, and performs image formation in an image formation area using energy from the light source element by apportioning the image formation area among the optical units. The optical unit array is an optical unit group formed by arranging n number of the optical units in a holder, N number of the optical unit groups are arranged in a holding member so as to cover a width of the image formation area, a gap is provided between the casings of adjacent optical units, and the optical units are installed in the holder detachably (here, n and N are natural numbers of two or more).

BRIEF DESCRIPTION OF THE DRAWINGS

The above and other objects, features, and advantages of the present invention will become more apparent from the following detailed description taken with the accompanying drawings, in which:

FIGS. 3 to 7 are front views of various light source apparatuses according to the present invention;

DESCRIPTION OF THE PREFERRED EMBODIMENT

The present invention will now be described in detail with reference to the drawings.

Figure 1:
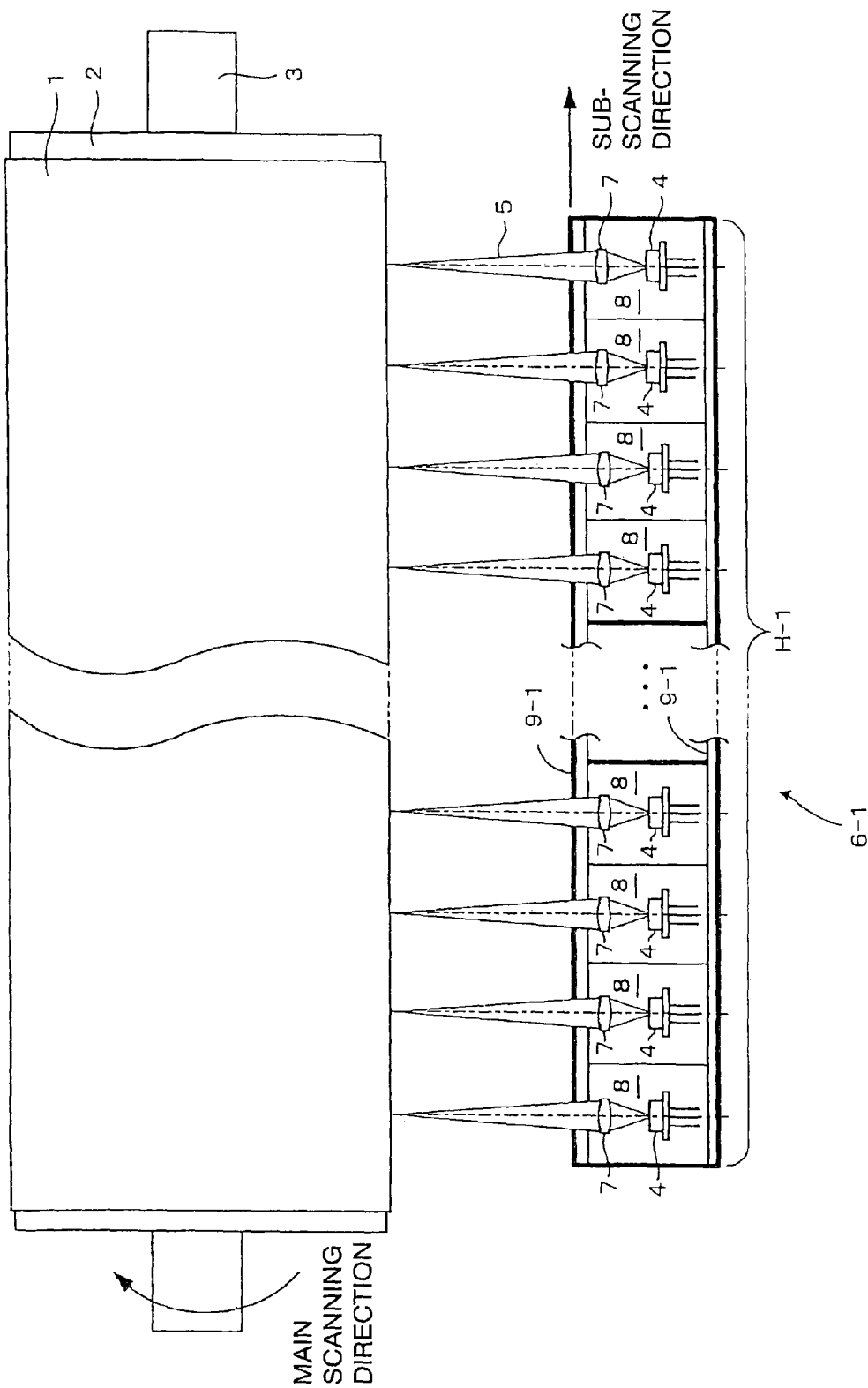
FIG. 1 is a plan view showing the constitution of the main parts of a recording apparatus according to the present invention.
Figure 2:
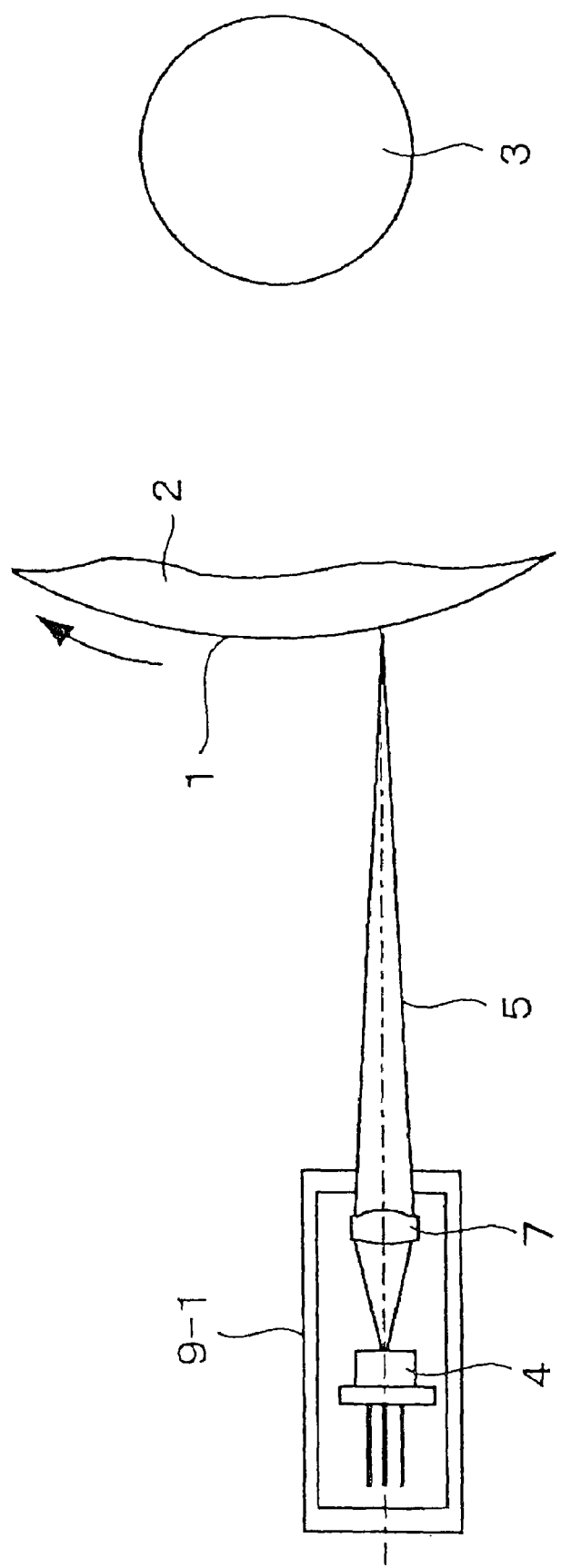
FIG. 2 is a side view of the recording apparatus.

FIGS. 1 and 2 show an example of a light source apparatus according to the present invention and a recording apparatus employing the light source apparatus. FIG. 1 is a plan view of the recording apparatus seen from above, and FIG. 2 is a side view of the recording apparatus of FIG. 1 as seen from a sub-scanning direction.

The recording apparatus shown in FIG. 1 forms an image in the following manner. When a drum 2 holding a recording medium 1 performs a single revolution in a main scanning direction (the rotation direction of the drum) about a rotary central shaft 3, an image-forming line is formed on the recording medium 1 by beams 5 emitted in a number corresponding to a number of light source elements 4, such as laser diodes, serving as light sources.

When the drum 2 completes a single revolution, the plurality of light sources (light source elements 4) move by a predetermined interval (a movement amount for connecting images formed by adjacent light sources, as will be described below) in the sub-scanning direction, or in other words the movement direction of the light source apparatus on which the plurality of light sources are held integrally, and when this movement is complete, a new line is formed on the recording medium 1 by the respective light sources. When all of the images produced by the lines formed by the respective light sources have been connected to the image formed by the adjacent light source, image formation ends.

In another image formation method, an image is formed by moving a light source apparatus 6 continuously in the sub-scanning direction in synchronization with the rotation of the drum 2 such that helical lines are formed on the recording medium 1. Likewise in this image formation method, the image formation operation ends when all of the images formed by the respective light sources have been connected to the image formed by the adjacent light source.

A heat-sensitive or photosensitive CTP printing plate or the like is used as the recording medium 1, but the recording medium 1 is not limited to these materials.

A light source apparatus 6-1 is constituted by a plurality of light source elements 4 serving as light sources, each light source outputting a single beam, lenses having an imaging ability corresponding respectively to (opposing) the light source elements 4, a plurality of optical units, and one (or more than one) holder.

The optical unit is a constitutional element of the light source apparatus comprising optical members such as a light source and a lens. In the light source apparatus 6-1 in FIGS. 1 and 2, the optical members provided in one optical unit 8 are constituted by one light source element 4 and a lens 7 corresponding thereto, which are disposed in the interior of a rectangular parallelepiped-shaped casing. The plurality of optical units are formed in the same size. The plurality of optical units 8 are provided in a number corresponding to the size of the drum 2 so as to cover an image writing area, and are lined up in series in the sub-scanning direction and held in a holder 9-1 such that a beam emission direction thereof is oriented toward the recording medium 1.

The optical units 8 comprising the optical members are held individually in the common holder 9-1 by screws, for example, and are arranged such that no other optical unit is positioned in an attachment/detachment direction. The optical units 8 are combined in a plurality, and can be separated at a boundary portion of an arbitrary optical unit by unscrewing the screw of the corresponding optical unit. In the drawing, the range of a single holder, or more specifically the range of the holder 9-1 in the sub-scanning direction, is denoted by the symbol H-1. As shown in the illustrated example, with a constitution in which a plurality of optical units in rectangular parallelepiped-shaped casings are arranged in series, an arbitrary optical unit can be attached or detached without being obstructed by the adjacent optical unit.

With this constitution, an arbitrary unit can be removed without affecting the other optical units, and therefore, when a single light source breaks, only the corresponding optical unit need be replaced. Furthermore, by separating the serially arranged optical units 8 appropriately at the boundary therebetween, light source apparatuses of different lengths can be formed easily and at low cost.

The holder 9-1 has to hold the plurality of optical units 8 together, and therefore has a length corresponding to the row direction length of the optical units. The holder 9-1 may be formed with grooves in which the optical units can be held or in plate form, but in this example, the holder 9-1 is constituted by a casing. Further, stoppers, guides, and so on may be provided appropriately to position the optical units 8 in fixed positions. When the holder 9-1 is constituted by a casing, beam transmission ports and an opening, lid, or the like for attaching and detaching the optical units are provided appropriately. A partitioning member may be provided between adjacent optical units to provide a guiding function when an optical unit is attached or detached.

By providing the optical members in the optical unit, the optical members can be fixed to the holder detachably in individual optical unit units by releasable holding means such as a screw. Further, by employing the holder, the strength of the light source apparatus 6 can be increased. In an elongated light source apparatus, it is particularly desirable to employ a holder that is large enough to hold a plurality of the optical units.

Figure 3:
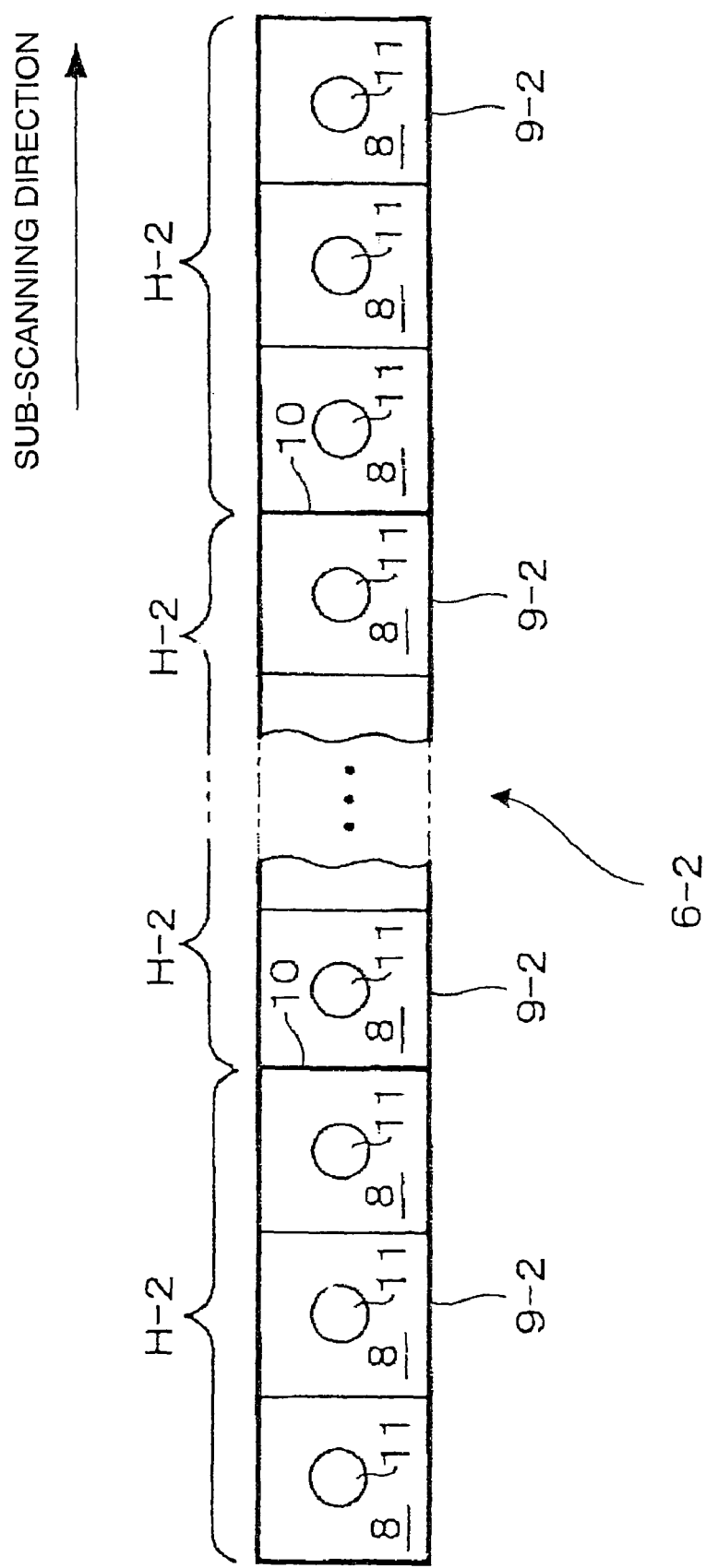

In a light source apparatus 6-2 shown in FIG. 3, one holder 9-2 holds three of the optical units 8, and a plurality of these holders 9-2 are arranged in a single, substantially straight line and attached to a holding member, not shown in the drawing, detachably by means such as a screw. In the drawing, the range of one holder, or more specifically the range of the holder 9-2 in the sub-scanning direction, is denoted by the symbol H-2. During maintenance, a subject holder can be detached from the holding member, and the optical units 8 in the holder can be replaced individually. Alternatively, a light source apparatus having a desired length can be formed by adjusting the length of the elongation direction. Note that in FIG. 3, an optical member 11 indicates the light source element 4, lens 7, and so on shown in FIGS. 1 and 2, and so on schematically. The serially assembled holders 9-2 are formed in a single row, similarly to the example shown in FIGS. 1 and 2, but as a modification, the number of rows may be increased in an orthogonal direction to the sub-scanning direction on the paper surface of FIG. 3 such that the plurality of optical units are arranged in two, three, or more rows in substantially straight lines. In so doing, the image writing efficiency can be improved.

Figure 4:
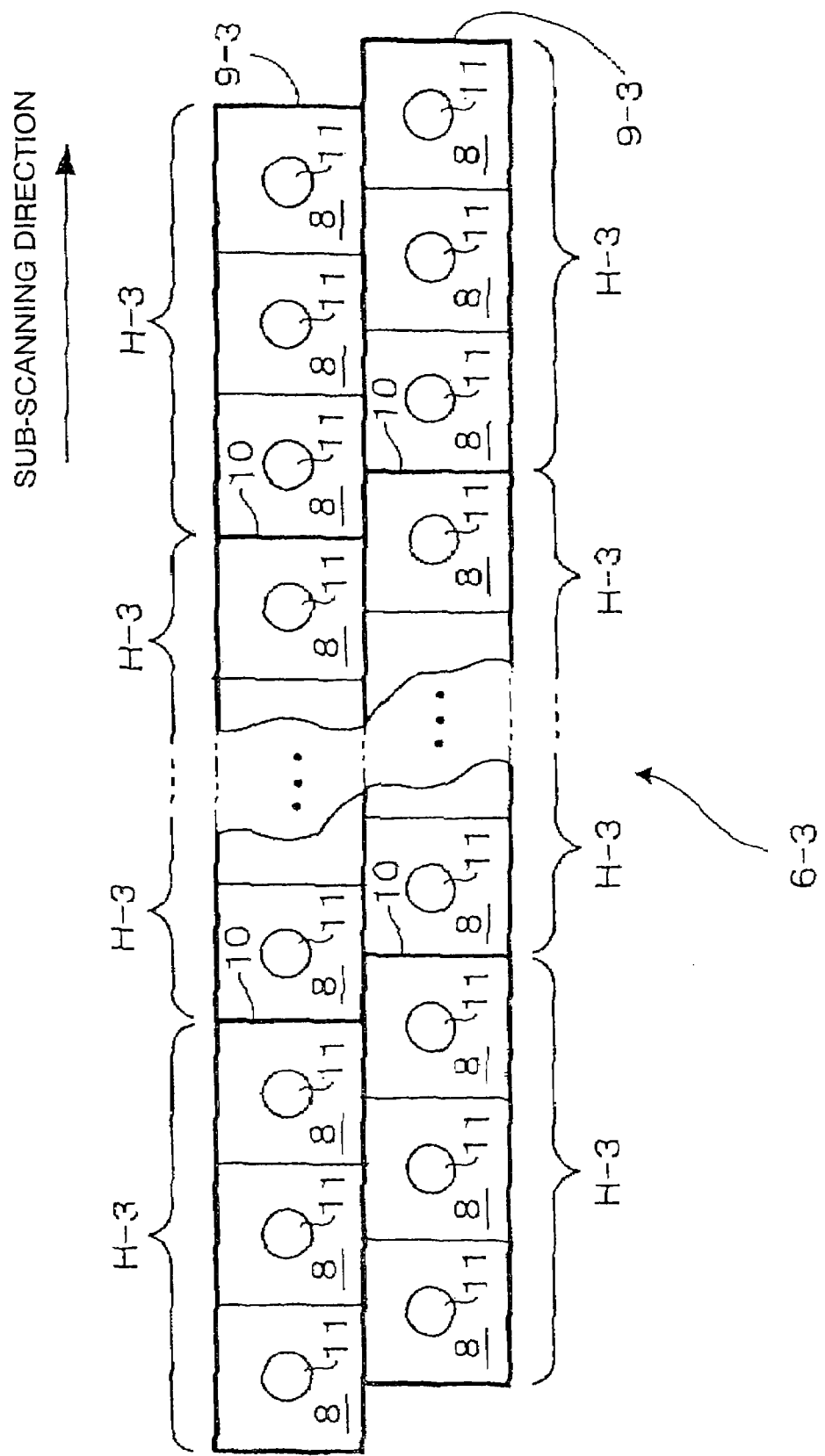

As another example of a holder, as shown in a light source apparatus 6-3 of FIG. 4, a holder 9-3 has a two-row constitution, and the phase of a boundary portion 10 on each row is shifted by ½ the optical member pitch such that the optical units 8 are arranged in staggered form. In so doing, the beam interval on the recording medium can be narrowed. In FIG. 4, the range of one holder, or more specifically the range of the holder 9-3 in the sub-scanning direction, is denoted by the symbol H-3. The intervals between the beams emitted by the light sources existing in a substantially straight line on each row must be substantially equal. In the examples described heretofore, the holder shown in FIGS. 1 and 2 is provided singly (in a single row), the holder 9-2 shown in FIG. 3 is provided in a plurality (in a single row), and the holder 9-3 shown in FIG. 4 is provided in a plurality (in plural rows).

In all of the examples, the optical units 8 can be attached to and detached from the holder individually by means of a screw structure, for example.

The features of the present invention will now be described in more detail. As noted above, in the present invention, the optical units 8, each of which has an integrated constitution incorporating the light source element 4, such as a laser, and the lens 7 for condensing the laser beam emitted by the light source element 4 in a casing, are arranged in a plurality in array form. Each optical unit 8 is responsible for a fixed range serving as an image writing range, and the optical units 8 cooperate to perform image formation or latent image formation onto a recording body using optical energy or optically generated thermal energy such that the entire image formation area width of the recording body is covered.

In other words, the optical units 8 described above are arranged in a plurality, but this leads to one problem. When the optical units 8 are arranged in a plurality such that the optical units 8 are lined up in close contact with each other in an array form, small irregularities in the casing outer shape dimension (the casing outer shape width of the optical unit 8 in the array direction) of each optical unit 8 lead to an accumulative error such that when the light source apparatus is extended in length, the disposal positions of the optical units 8 at the two end portions deviate from the original desired positions. As a result, the positional precision of the optical units 8 cannot be secured.

The present invention is a light source apparatus applied to a technique for performing extremely high-precision writing between 24000 dpi and 3600 dpi, for example, and therefore the inability to dispose the optical units 8 as desired is a serious problem.

In consideration of this problem, in the present invention the casing outer shape width of the optical unit 8 in the array direction is set such that a gap of approximately 0.05 mm to 2 mm can be formed between the casings of adjacent optical units 8. In other words, in the present invention, the casing outer shape width of the optical unit 8 in the array direction is formed to be approximately 0.05 mm to 2 mm smaller than the distance (the width of the image area for which one optical unit 8 is responsible) moved by the optical unit 8 in the sub-scanning direction (the array direction of the optical units 8).

As a specific example, when the beam interval, or in other words the width of the image area for which one optical unit 8 is responsible, is set at 11.176 mm, the casing outer shape width of the optical unit 8 in the array direction is set at 11 mm, and thus the casings are arranged in array form such that a slight gap can be formed between adjacent casings.

Each optical unit 8 is attached in an individually detachable manner to the holding member or holder by a screw or the like. During this attachment operation, the individual optical units 8 are subjected to positioning adjustment prior to attachment, and the casings of the optical units 8 are not arranged in close contact with each other. Therefore, even when a large number of the optical units 8 are arranged in array form, a reduction in the disposal position precision of the optical units 8 due to an accumulative pitch error does not occur, enabling the realization of a light source apparatus that can be applied favorably to a technique for performing extremely high-precision writing of 2400 dpi to 3600 dpi.

Note that in the example described above, a reduction in the attachment position precision of the optical units 8 due to an accumulative pitch error when a plurality of the optical units 8 are arranged in array form is avoided by providing a gap between the casings of adjacent optical units 8, and in the present invention, this idea is also applied to a case in which holders holding a plurality of the optical units 8 are arranged.

More specifically, as shown in FIG. 3, three optical units 8 (typically, n optical units, n being a natural number of 2 or more) are arranged in the holder 9-2, and a plurality of the holders 9-2 (typically N holders, N being a natural number of 2 or more) are arranged on a holding member to cover the aforementioned image formation area width. Similarly to the gap of approximately 0.05 mm to 2 mm provided between the casings of adjacent optical units 8, as described above, a gap of approximately 0.05 mm to 2 mm is provided between adjacent holders of the holders 9-2.

In so doing, a reduction in precision caused by an accumulative pitch error in the holders 9-2 when a plurality of the holders 9-2 are arranged on the holding member can be prevented in a similar manner to the case described above, in which a reduction in the disposal position precision of the optical units 8 due to an accumulative pitch error is prevented. Similarly to the optical units 8, the outer shape dimension of each holder 9-2 is formed to be approximately 0.05 mm to 2 mm smaller than the writing area width for which the plurality of optical units 8 (typically n optical units, n being a natural number of 2 or more) in the holder are responsible.

Each holder 9-2 is attached in an individually detachable manner to the holding member by a screw or the like. The individual holders 9-2 are subjected to positioning adjustment prior to attachment, and therefore, even when a large number of the holders 9-2 are arranged in array form, a reduction in the disposal position precision of the holders 9-2 due to an accumulative pitch error does not occur, enabling the realization of a light source apparatus that can be applied favorably to a technique for performing extremely high-precision writing of 2400 dpi to 3600 dpi.

As is evident from the above description, in the present invention, n optical units are arranged detachably with a gap provided between adjacent optical units. In an alternative constitution, n optical units are disposed in a holder as a single optical unit group, and when N holders are provided, the holders are arranged detachably with a gap provided between adjacent holders. Here, n and N are natural numbers of 2 or more.

In both the optical units and the holders, the gap serves to absorb an accumulative error when the optical units or holders are arranged in a plurality, but the gap also plays the following roles.

Firstly, positioning adjustment is performed when attaching the optical units or holders, and at this time, the gap serves as a positioning adjustment margin.

A second role of the gap is as thermal insulation between adjacent optical units or holders. In the present invention, a laser diode or the like is used as the light source element, and the heat generated by the individual light source elements is prevented from being transmitted to the adjacent light source element by the layer of air present in the gap. As a result, characteristic variation in the individual light source elements due to thermal interference is prevented.

A method of arranging the optical units or holders of the present invention was described in detail above. In a light source apparatus constituted such that a plurality of the optical units are disposed in a single holder, maintenance can be performed by attaching and detaching the individual optical units in single units, and in a light source apparatus formed by combining a plurality of the single holders each holding a plurality of the optical units, maintenance can be performed by attaching and detaching the single holders in single units, and by attaching and detaching the individual optical units in single units.

In all of the light source apparatuses described above, a plurality of the optical units are combined separably, and therefore, when a light source breaks, the optical unit can be replaced at low cost.

Next, the features of the present invention will be described in further detail.

As described above, the present invention is a light source apparatus for application to a technique for performing extremely high-precision writing of 2400 dpi to 3600 dpi, for example, and in the present invention, the optical units 8 are arranged over a length of 1000 mm to 2000 mm in the array direction. Since the definition is extremely high and the recording width is long, it is difficult to maintain beam position precision due to thermal expansion in the holder and the holding member.

Ideally, the problem of a reduction in the beam position precision caused by thermal expansion can be avoided by forming the casing of each optical unit 8, the holder in which n optical units 8 are disposed, and the holding member holding N holders from identical materials.

In the present invention, however, this problem is solved without the need to provide identical materials. In the present invention, the casing of each optical unit 8 is formed by an aluminum alloy such as A5056 in consideration of the workability and low weight thereof. Alternatively, the casing of each optical unit 8 may be formed from aluminum die cast.

The holder is formed from brass in consideration of the workability and strength thereof, and not from an identical material to the casing.

Further, the holding member for holding the holder is formed from stainless steel such as SUS304 due more than anything to the strength thereof, and thus the holding member is also formed from a different material.

Since all of these materials are different, a thermal expansion difference occurs such that when a large number of the optical units are arranged over a length of 1000 mm to 2000 mm in the array direction, the problem of a reduction in the beam position precision due to thermal expansion cannot be ignored. In the present invention, however, the gap is provided between adjacent casings or adjacent holders to absorb an accumulative pitch error, as described above, and therefore the thermal expansion difference can also be absorbed by the gap.

In other words, a reduction in precision generated when a compound material formed by laminating different materials together bends in the manner of a bimetal due to a thermal expansion difference can be avoided by arranging the optical units or holders on the holding member or the like with a slight gap therebetween such that adjacent casings or adjacent holders are not in close contact, as in the present invention.

Figure 5:
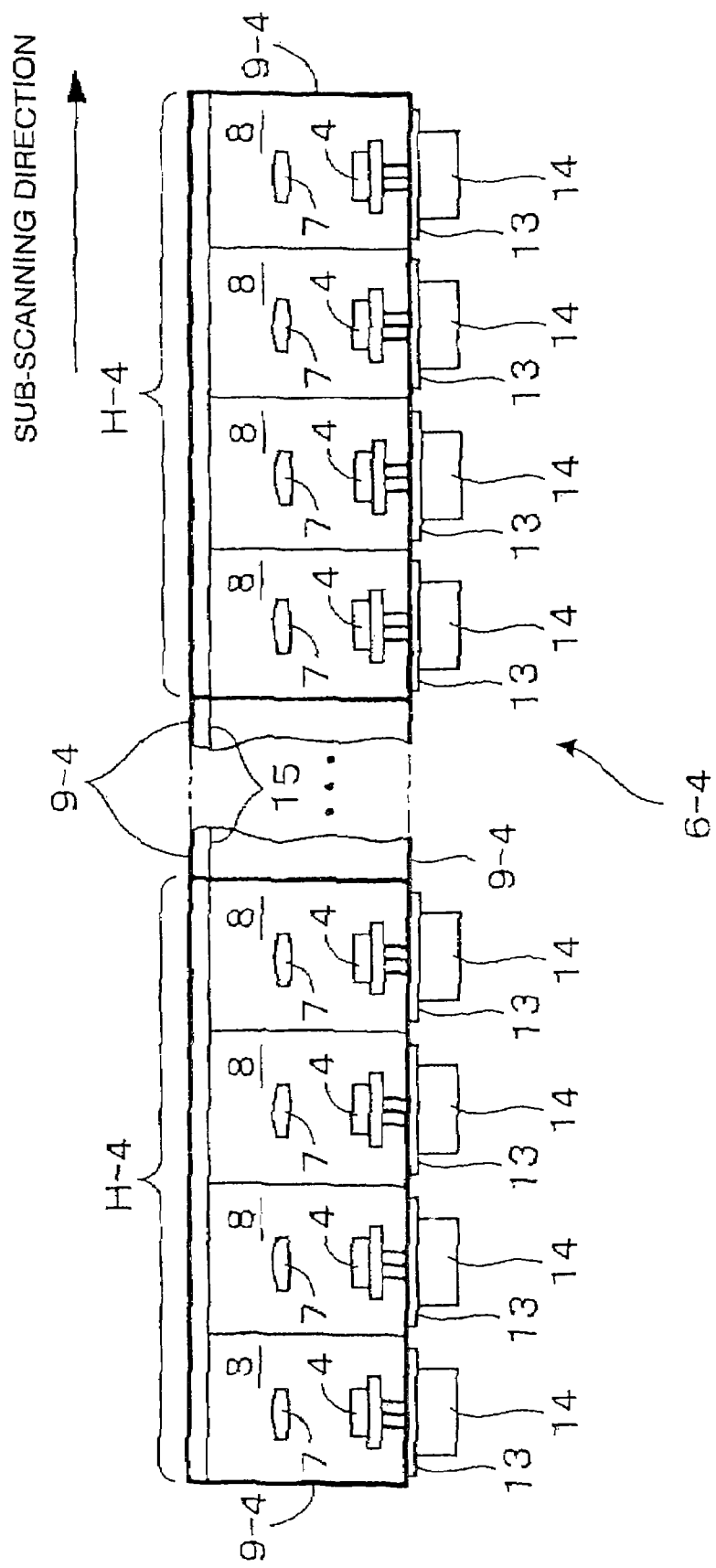

A light source apparatus 6-4 shown in FIG. 5 is similar to the light source apparatus 6-3 of FIG. 3 in that a plurality of holders 9-4 (in a single row) are provided, and four of the optical units 8 are disposed in one holder. In the drawing, the range of one holder, or more specifically the range of the holder 9-4 in the sub-scanning direction, is denoted by the reference symbol H-4.

When light source apparatuses of many lengths are manufactured using the holders 9-4 comprising four of the optical units 8 for emitting four beams, light source apparatuses of various lengths can be manufactured according to the unit length of one holder (four beams). For example, when the beam interval is set at 11.176 mm, a length of 11.176×4 mm, or in other words 44.704 mm, is recorded by each holder 9-4 installed with four of the optical units 8. Therefore, a light source apparatus having 12 of the holders 9-4 can be used for 515 mm recording, a light source apparatus employing 24 of the holders 9-4 can be formed for 1030 mm, and in this manner, light source apparatuses of many lengths can be provided. Note that in the case of 1030 mm recording, 93 beams are required, but when 24 holders 9-4, each holding four of the optical units 8, are used, 4×24=96 beams are provided. Hence, the end holder does not require four optical units, and may be installed with a single beam, or in other words a single optical unit.

Figure 6:
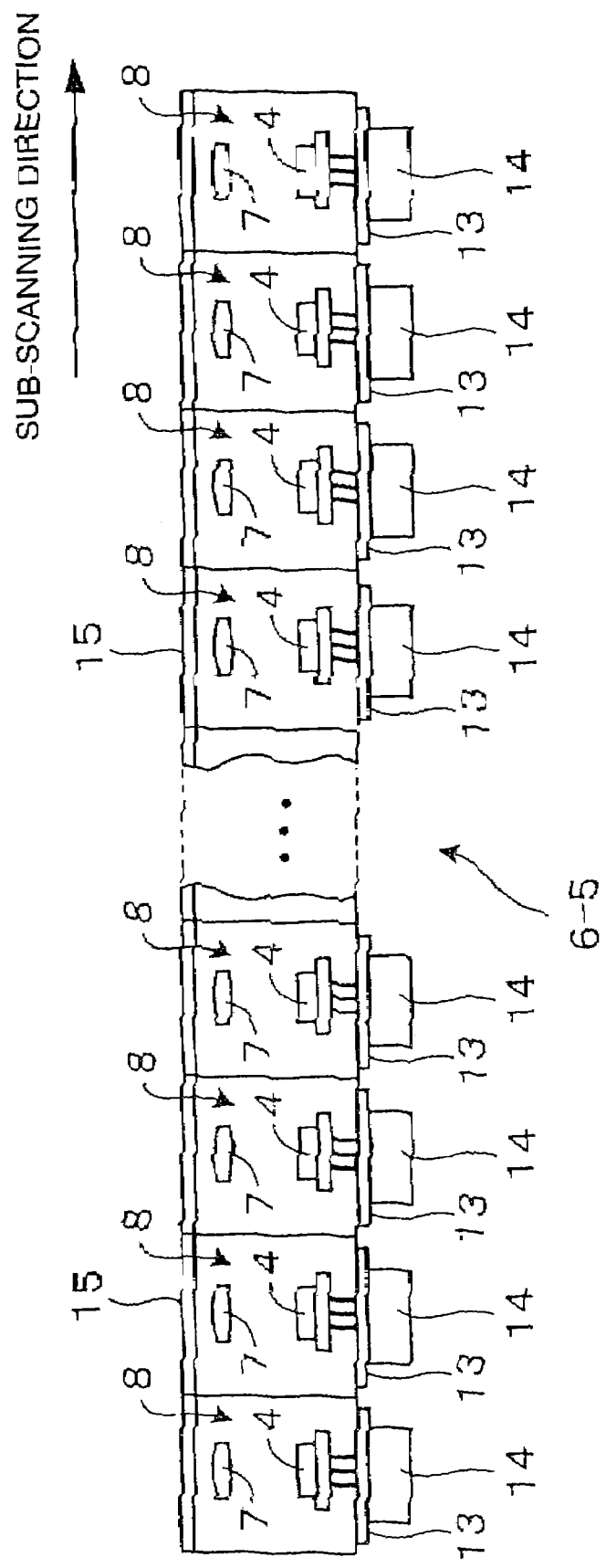

As another example, a light source apparatus may be constituted by the optical units 8 alone, without using a holder, as in a light source apparatus 6-5 shown in FIG. 6. In this example, the light source apparatus is formed by directly attaching each optical unit 8 detachably to the main body of an image recording apparatus or the like, not shown in the drawing.

In this example, the length of the light source apparatus can be varied in beam width units, enabling an improvement in freedom. With a constitution in which the optical units 8 can be attached and detached in single units, the cost of a replacement component when one of the light sources breaks can be reduced greatly.

A light source apparatus 6-6 shown in FIG. 7 is similar to the light source apparatuses shown in FIGS. 1 and 3 in that many optical units 8 are installed in an individually detachable manner in a single holder 9-5 in a single row. In the light source apparatuses of the various examples described heretofore, a reasonably priced, small semiconductor laser is preferably employed as the light source element 4 used as the light source, but there are no particular limitations on the light source, and in applications where the beam shape and output stability are important, a gas laser or solid state laser may be used.

In the light source apparatuses of the various examples described heretofore, the lens 7 is disposed after adjusting the optical axis thereof to face the corresponding light source, and comprises a mechanism which is capable of adjusting the position thereof to the front and rear along the optical axis. The lens 7 may be a single lens such as a double-sided aspheric lens having both a collimating function and a condensing function, or may be constituted by a lens group including a plurality of lenses. Further, as means for varying the diameter of the beam emitted onto the recording surface, an aperture may be disposed between the light source and the lens or between the lens and the recording surface.

An example in which an aperture is fixed directly to the lens 7 will now be described with reference to FIGS. 8A to 8D.

Figure 8A:
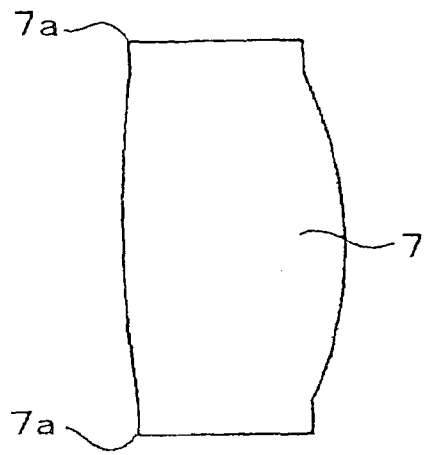
FIG. 8A is a front view of a lens according to the present invention.
Figure 8B:
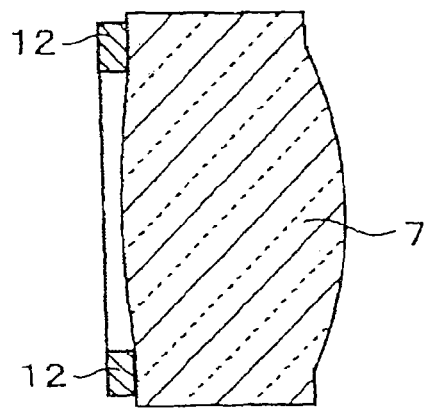
FIG. 8B is a front view of a lens having a fixed aperture.
Figure 8C:
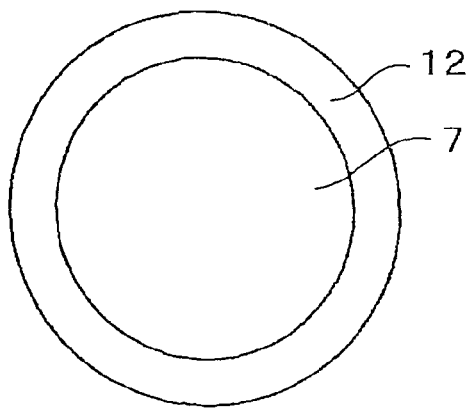
FIG. 8C is a side view of a lens having a fixed aperture.
Figure 8D:
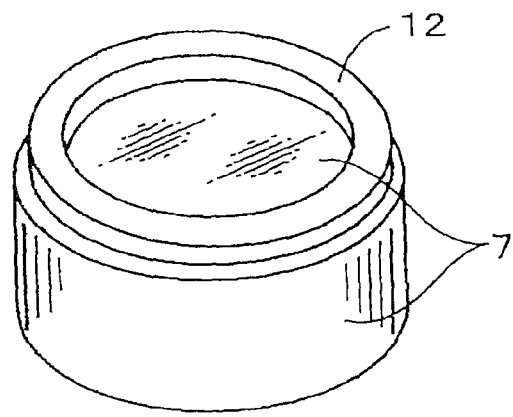
FIG. 8D is a perspective view of a lens having a fixed aperture.

FIG. 8A shows an example of a double-sided aspheric lens serving as the lens 7. As shown in FIG. 8B, an annular aperture 12 having an identical outer diameter to that of the lens 7 is fixed to a rim portion 7a of the lens 7 by adhesion or the like. FIG. 8C shows the lens 7, to which the aperture is fixed, from an optical axis direction, and FIG. 8D is a perspective view thereof. Thus, an aperture can be formed integrally with the lens using a simple method.

Other members installed in the optical unit 8 will now be described.

A substrate has a function for driving the light source using an external signal generated in accordance with image information, and a function for outputting to the outside the output of a photosensor disposed in a light source package or in the vicinity of the light source. The light source and substrate may be fixed to each other directly by soldering or the like, or may be connected via a cable. Further, the substrate may have a function for generating a current for driving the light source in accordance with a signal input from the outside or a function for inputting an externally generated light source driving current and outputting the current to the light source.

In the examples of light source apparatuses shown in FIGS. 5, 6, and 7, the light source elements 4 are fixed directly to a substrate 13, and in these embodiments, one substrate 13 is provided for each optical unit 8. Note that in a light source apparatus comprising a holder, the substrates 13 may be provided in the holder. At least one connector 14 for transmitting light source driving force and various information signals is typically installed in each substrate 13 to enable signal exchange with the light source or photodiode.

A lens cover is required to prevent damage to the lens 7 and dust from adhering thereto. In a light source apparatus for writing an image onto an ablation recording medium, a particularly large amount of dust is generated during exposure, and therefore a mechanism for removing dust that adheres to the lens cover surface is required. One lens cover may be provided for each optical unit or for each holder.

In the light source apparatuses 6-4, 6-5, 6-6 shown in FIGS. 5, 6, and 7, a lens cover 15 is provided independently for each optical unit 8. Note that in the examples shown in FIGS. 5 and 7, which are constituted with holders, the lens cover may be provided on the holders.

By keeping the periphery of the light source, including the light source and the light source apparatus casing, at or below a predetermined temperature, the light source output can be stabilized and temperature-generated expansion and contraction of the light source apparatus casing can be prevented. A temperature control member is provided as means for performing this temperature control.

To make the temperature control member separable in relation to the optical units 8, the size and capacity of the temperature control member must be aligned with the number and size of the temperature control subject optical units 8. To enable separation, a large number of small, low capacity temperature control members are used, and therefore bias in the temperature of the light source apparatus can be reduced easily such that a high image quality can be obtained with stability.

The temperature control member may possess either or both of a cooling function and a heating function, and the functions of the temperature control member are selected in accordance with the anticipated disposal environment of the apparatus. For the cooling function, liquid cooling such as water cooling, gas cooling such as air cooling, a Peltier element, or another pre-existing method may be used, and likewise for the heating function, a pre-existing method such as a heating wire, a ceramic heater, warm air, warm liquid, and electromagnetic induction heating may be used. To reduce bias in the temperature distribution using both functions, a heat pipe and a material having high thermal conductivity may be combined, and as long as the method can be installed in the optical unit, there are no particular limitations thereon.

Figure 9:
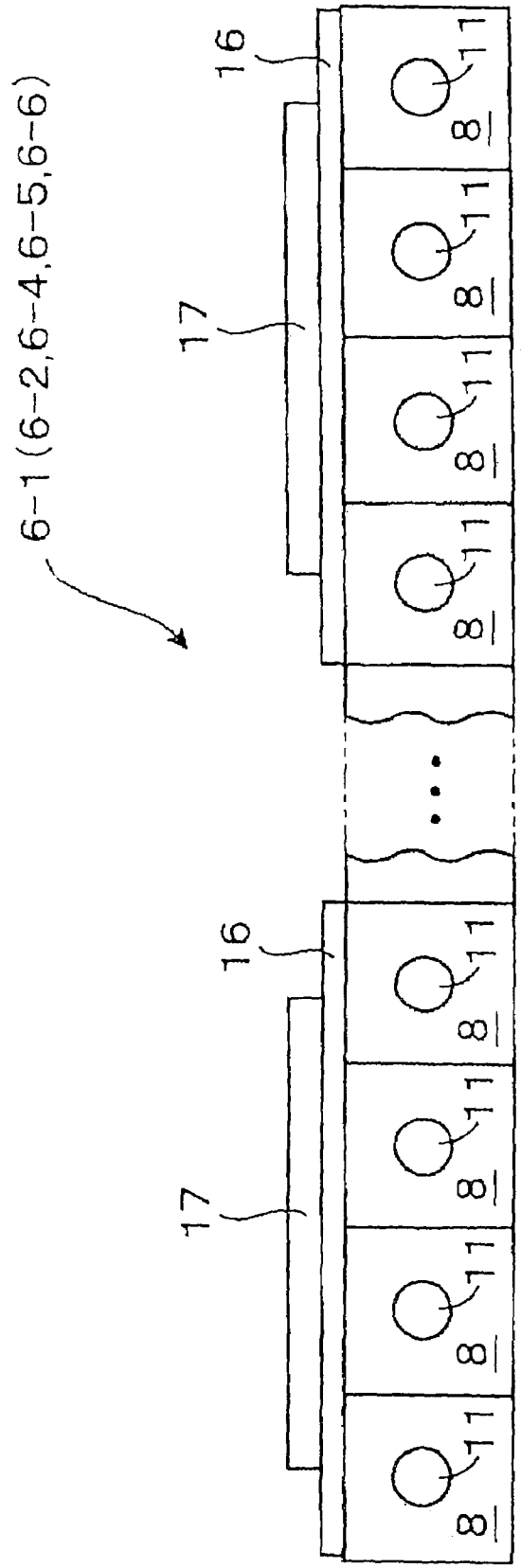
FIGS. 9 and 10 are front views of the light source apparatus.
Figure 10:
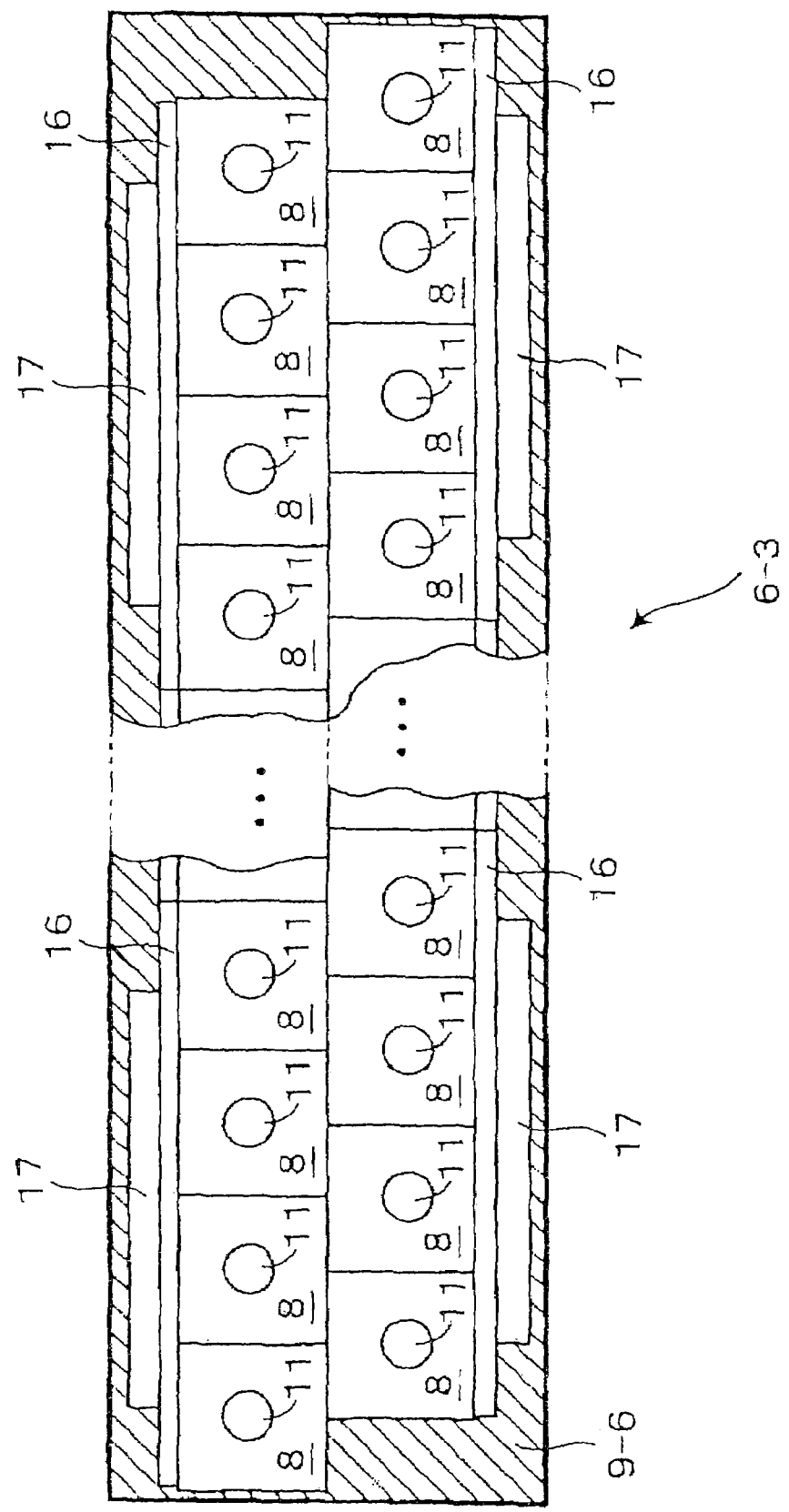

FIGS. 9 and 10 show embodiments of the temperature control member. The disposal position of the temperature control member differs depending on whether the light source apparatus is constituted in a single row (FIGS. 1 to 7), as shown in FIG. 9, or in two rows (FIG. 4), as shown in FIG. 10.

In the light source apparatus (6-1, 6-2, 6-5, 6-6) shown in FIG. 9, a temperature control member 17 is provided in units of four optical units on a side wall portion of an identical side via a high thermal conductivity material 16, and in the light source apparatus (6-3) shown in FIG. 10, the temperature control member 17 is provided in units of four optical units on a side wall portion of an identical side of each row via the high thermal conductivity material 16, and held by the holder 9-6. Note, however, that the holder 9-6 need not be provided. Also note that in cases with three or more rows, the temperature control member is disposed between each row via the high thermal conductivity material. When the temperature control member is disposed in this manner, the space on the periphery of the optical units can be used effectively. Note that in a light source apparatus provided with a holder, the temperature control member may be provided in the holder via the high thermal conductivity material.

It was learned that by forming the constitutional elements of the light source apparatus into an optical unit as described above, the object of the present invention can be achieved. In other words, by providing an optical unit comprising not only a light source, a lens, a beam-shaping aperture, and so on, but also a light source circuit board, a connector, a light source temperature control member, a lens cover, and so on, and making each constitutional element separable in accordance with the optical unit, light source apparatuses having various lengths can be formed, and when one component breaks, a replacement component can be provided at low cost.

Various examples of printing operations using a recording apparatus comprising the light source apparatus described above and an image forming apparatus comprising the recording apparatus will now be described.

Figure 11:
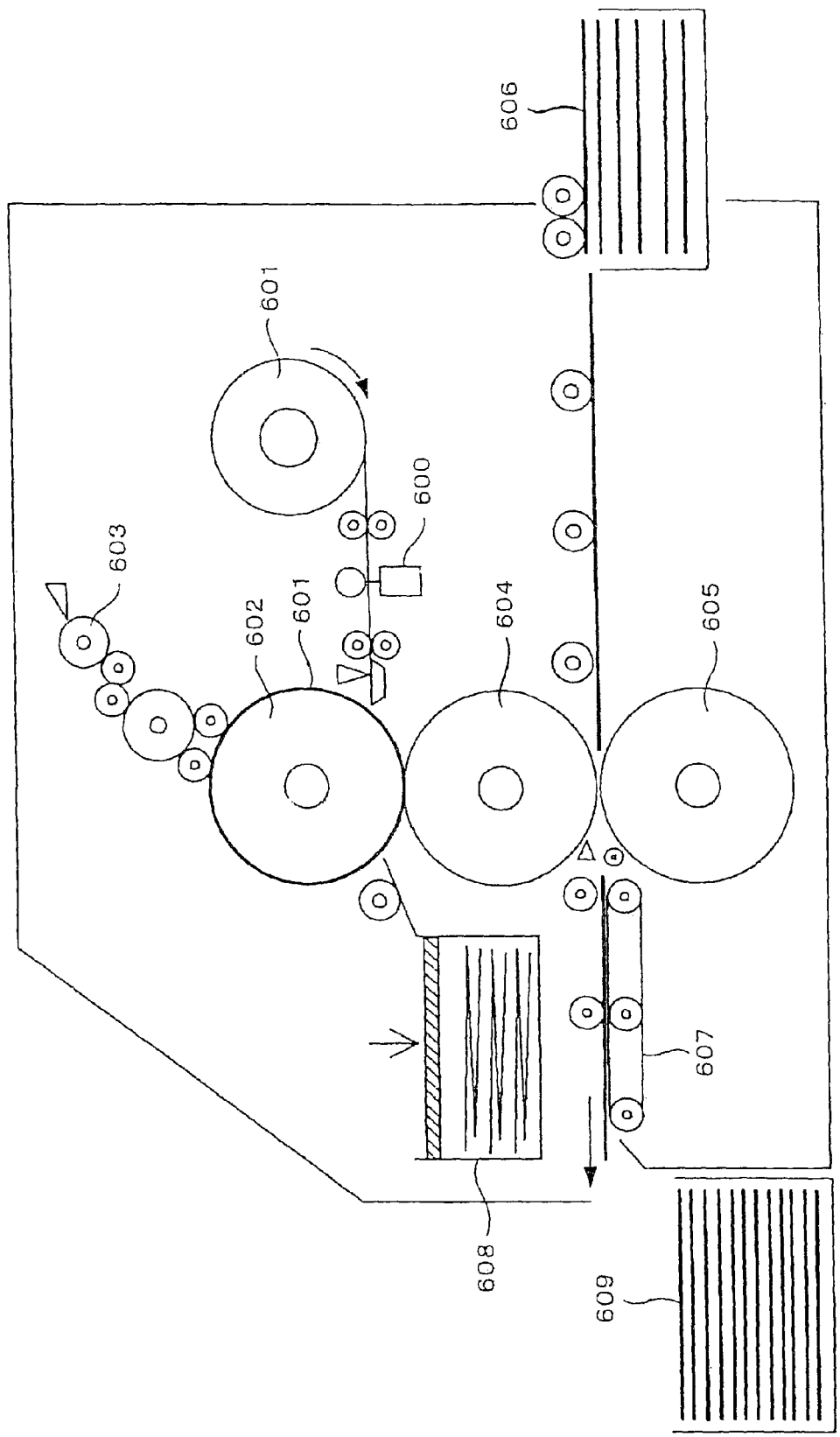
FIGS. 11 to 14 are views showing the constitution of an image forming apparatus including a recording apparatus.
Figure 12:
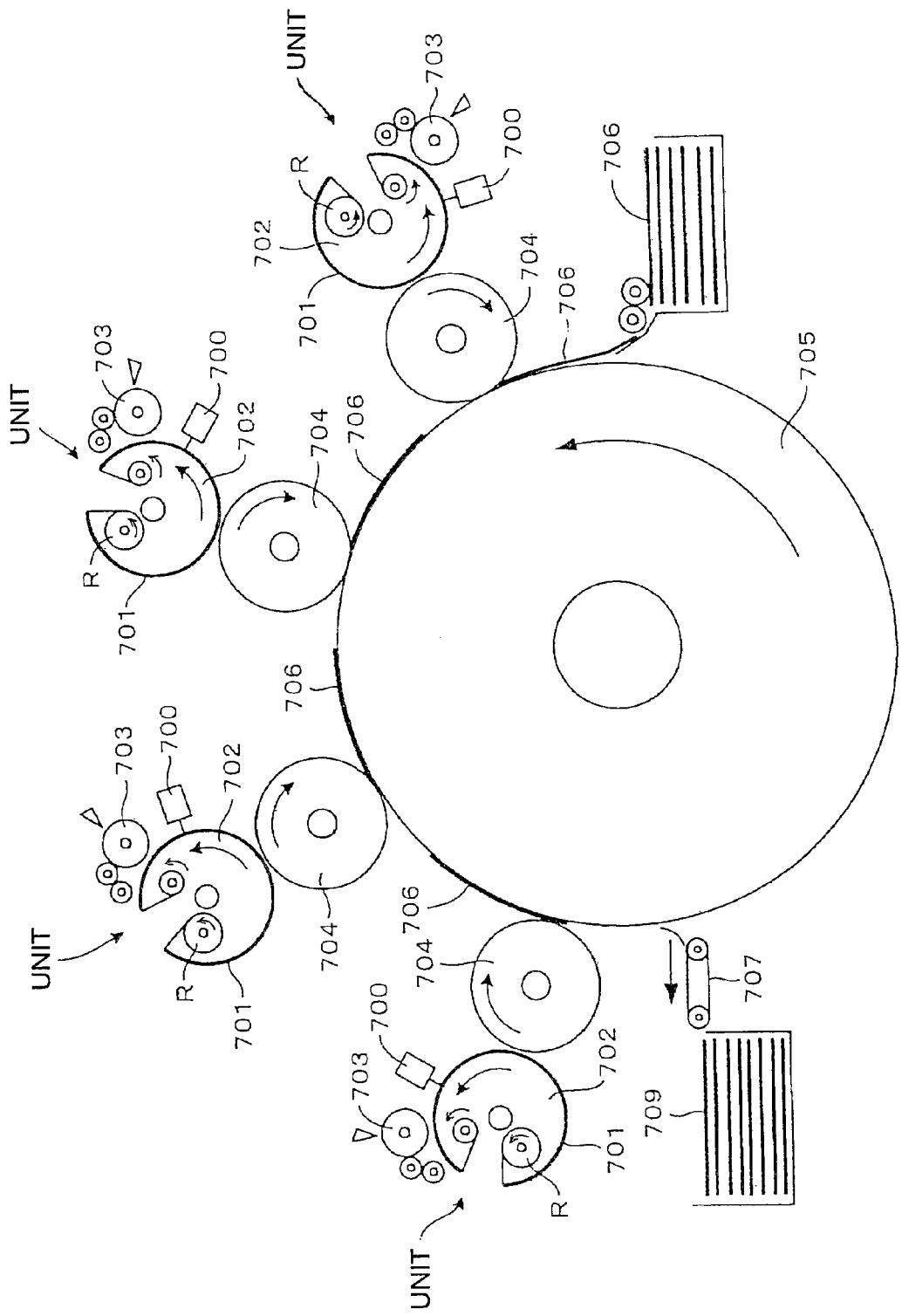
Figure 13:
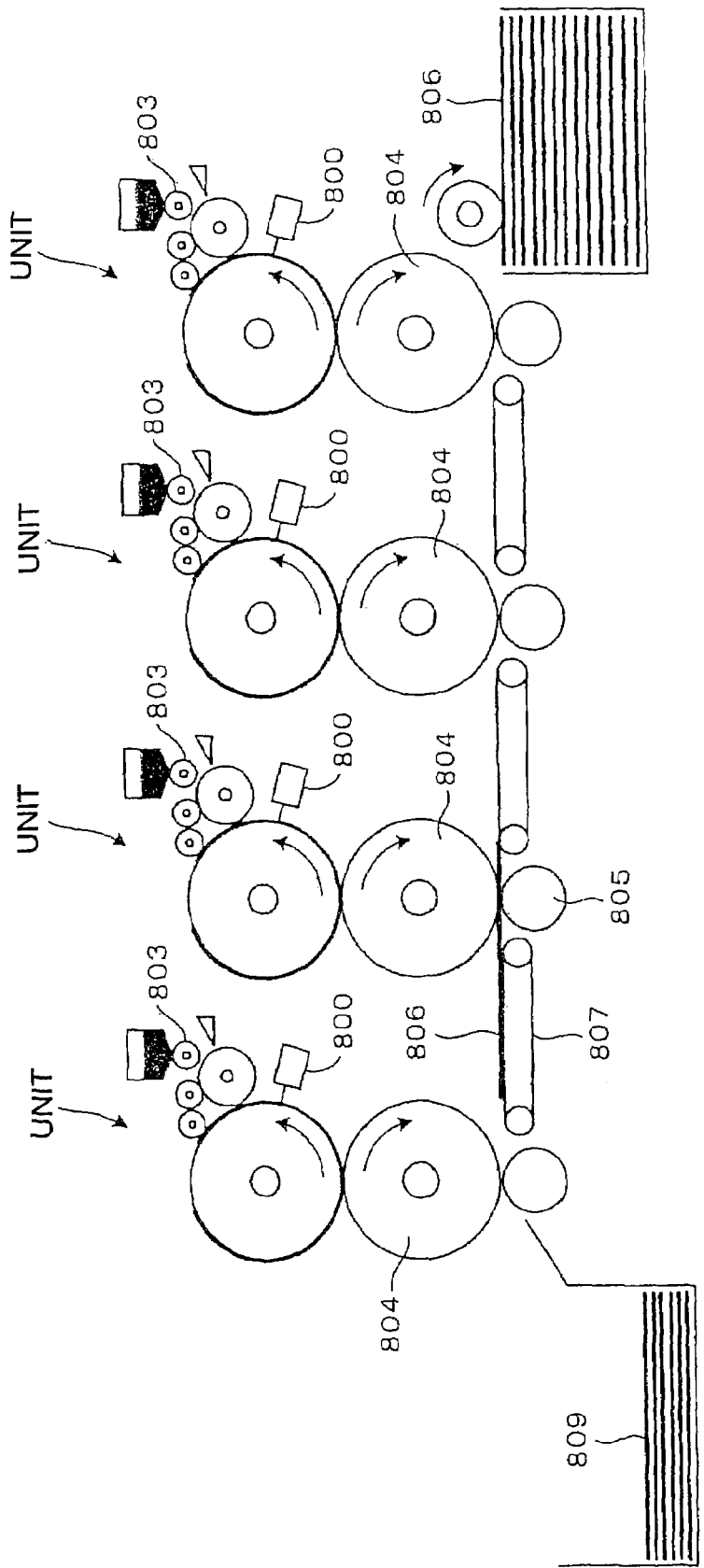

FIG. 11 shows an example of a monochrome printing apparatus (a DI machine), FIG. 12 shows an example of a four-color printing apparatus (a DI machine) having a single impression cylinder, and FIG. 13 shows an example of a four-color printing apparatus (a DI machine) which is a four-drum tandem DI machine having individual impression cylinders. Note that a DI (Direct Imaging) machine is a printing apparatus having both a function for preparing a printing plate by exposing an image on a computer onto the printing plate, and a function for performing printing onto recording paper serving as an example of a sheet-form medium.

In the printing apparatus shown in FIG. 11, a light source apparatus 600 (corresponding to the light source apparatuses 6-1 to 6-7) of the present invention performs exposure corresponding to image information on a recording medium 601 such as a printing plate, thereby forming an ink adhesion area (ink-philic area) and an ink non-adhesion area (ink repellent area) on the surface of the recording medium 601.

Next, the recording medium 601 is set on a drum 602 (corresponding to the drum 2), whereupon the drum 602, an intermediate transfer body 604, an inking roller 603 group, and a pressure roller 605 are rotated synchronously such that ink is supplied to the ink-philic area on the surface of the recording medium 601 from the inking roller 603, thereby forming an ink image. The ink image is transferred onto the intermediate transfer body 604 having a rubber member such as a blanket on its surface, and then the ink image on the intermediate transfer body 604 is transferred onto recording paper 606. The transfer paper 606 is then conveyed by printed matter conveyance means 607 and placed on a discharge table as printed matter 609. Note that after use, the recording medium 601 is stored in a container.

In the printing apparatus shown in FIG. 12, units corresponding to four colors (each of cyan, magenta, yellow, and black) are disposed on the periphery of a single pressure drum 705, and each unit comprises an inking roller 703 group in the corresponding color, a recording medium holding drum 702, a light source apparatus 700 (corresponding to the light source apparatuses 6-1 to 6-7), and an intermediate transfer member 704 as the main constitutional elements thereof. The operation of each color unit is substantially identical to that of the apparatus shown in FIG. 11, but in this example, the recording medium 701 is fed out from a recording medium roll R provided on the recording medium holding drum 702 and set, whereupon exposure is performed on the recording medium 701 by the light source apparatus 700 to form an image for printing. During printing, the constitutional elements of each color unit and the pressure drum 705 rotate synchronously, whereby images in each color are transferred sequentially onto recording paper 706, and as a result, a full color image is printed. The recording paper 706 is then conveyed by printed matter conveyance means 707 and placed on a discharge table as printed matter 709.

In the printing apparatus shown in FIG. 13, units corresponding to four colors (each of cyan, magenta, yellow, and black) are disposed in tandem, and each unit comprises an inking roller 803 group in the corresponding color, a recording medium (printing plate) 801, a recording medium holding drum 802, a light source apparatus 800 (corresponding to the light source apparatuses 6-1 to 6-7), an intermediate transfer member (blanket) 804, and a pressure drum 805 as the main constitutional elements thereof. Printing is performed in a substantially identical manner to that of the printing apparatus shown in FIG. 12, in that a full color image is printed by transferring images in each color sequentially onto recording paper 806, after which the recording paper 806 is conveyed by printed matter conveyance means 807 and placed on a discharge table as printed matter 809.

Figure 14:
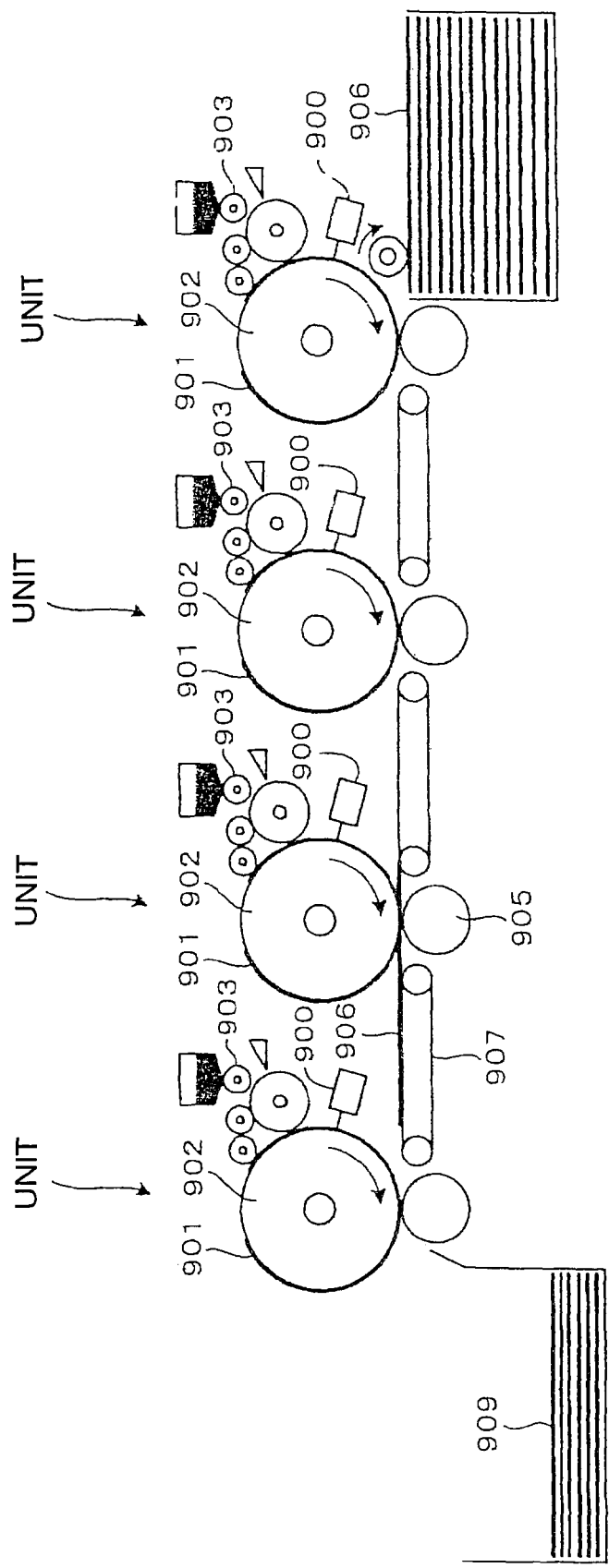

FIG. 14 shows an example of an apparatus for transferring a coloring material image formed on a drum directly onto recording paper rather than via an intermediate transfer body, as in the example shown in FIG. 13.

Units corresponding to four colors (each of cyan, magenta, yellow, and black) are disposed in tandem, and each unit comprises an inking roller 903 group in the corresponding color, a recording medium (printing plate) 901, a recording medium holding drum 902, a light source apparatus 900 (corresponding to the light source apparatuses 6-1 to 6-7), and a pressure drum 905 as the main constitutional elements thereof. Printing is performed in a substantially identical manner to that of the printing apparatus shown in FIG. 12, in that a full color image is printed by transferring images in each color sequentially onto recording paper 906, after which the recording paper 906 is conveyed by printed matter conveyance means 907 and placed on a discharge table as printed matter 909.

In this apparatus, transfer of the coloring material onto the recording paper must be made easy. In other words, low viscosity is required. Alternatively, a material such as a blanket, which possesses elasticity such that the coloring material can be rubbed onto the recording paper side, may be used. Preferably, a coloring material adhesion part or a coloring material non-adhesion part is formed on the drum by resin or the like by exposure during each printing operation, removed at the end of the printing operation, and cleaned in preparation for the next printing operation.

Each of the printing apparatuses described above is an image forming apparatus comprising an apparatus portion that performs exposure on the recording medium (601, 701, 801, 901) using the light source apparatus (700, 800, 900) to form an image for printing, this apparatus portion corresponding to the recording apparatus of the present invention, in which ink is supplied by means for forming a multicolored image, such as an inking roller group, to a recording medium on which the image for printing has been recorded by the recording apparatus to form a coloring material image, where upon the multicolored image is transferred on to recording paper, serving as an aspect of a sheet-form medium, using transfer means such as a pressure drum (605, 705, 805, 905) either via an intermediate transfer body (604, 704) or not via an intermediate transfer body.

The optical unit will now be described in further detail.

Figure 15:
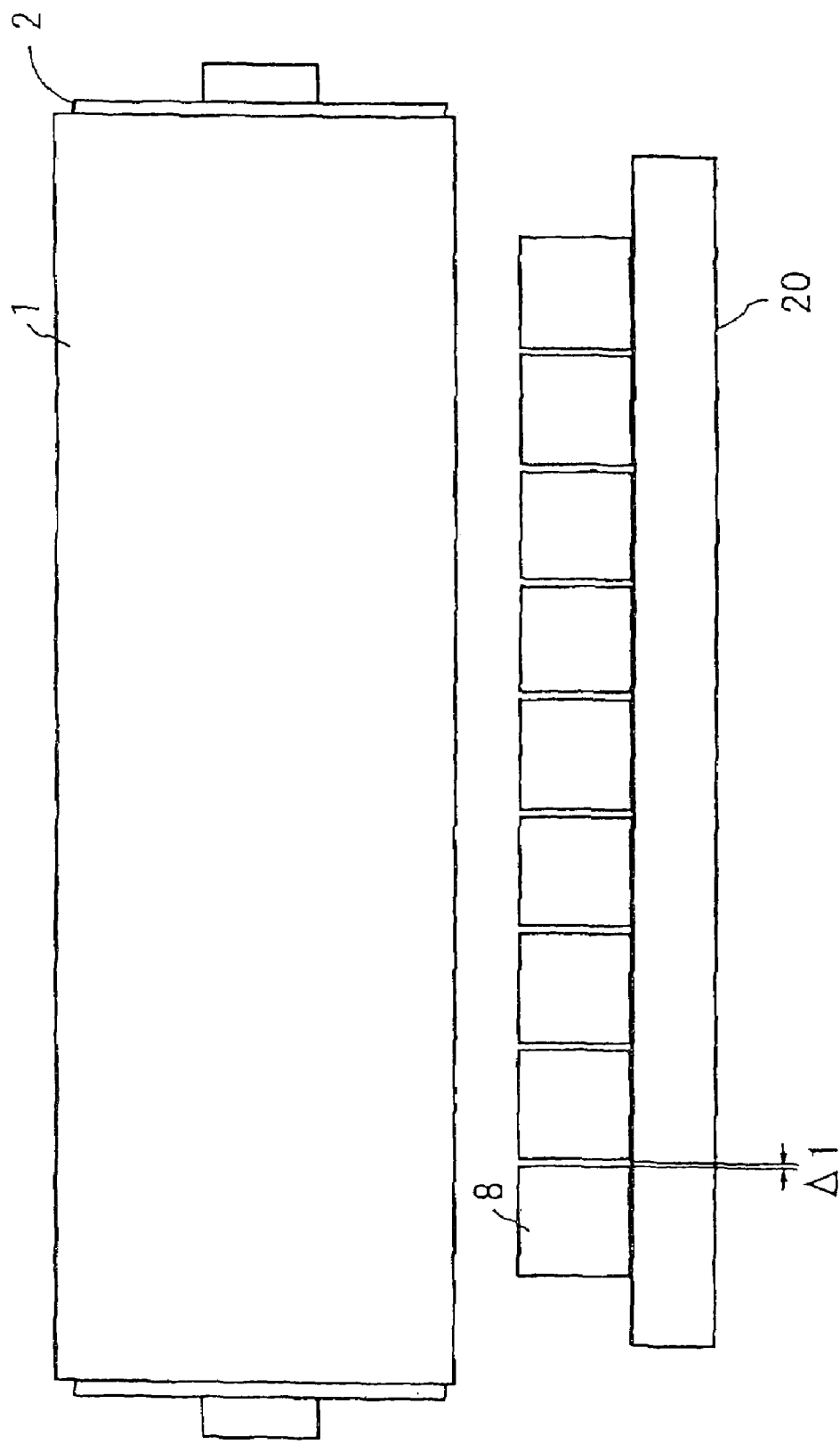
FIG. 15 is a view showing an example of the arrangement of optical units provided opposite a drum.

As shown in FIG. 15, the optical units 8 are attached directly to a holding member 20 with a gap $\Delta 1$ between adjacent optical units. Alternatively, as shown in the examples in FIGS. 16 and 17, the optical units 8 are attached to a holding member 21 via the holders 9-2, and the holders 9-2 are held on the holding member 21 with a gap $\Delta 2$ between adjacent holders, whereby the holding member 21 carrying the optical units 8 moves in the sub-scanning direction by an image formation area apportioned width (to be described below).

Figure 16:
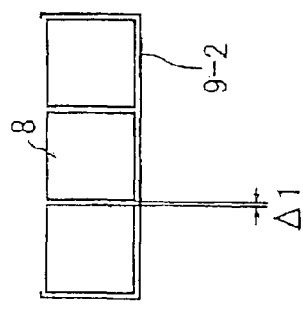
FIG. 16 is a view showing an example of a holder in which a plurality of the optical units are disposed.

FIG. 16 shows an example in which three optical units 8 are held by one of the holders 9-2. As shown in FIG. 16, the optical units 8 are disposed in the holder 9-2 with the gap $\Delta 1$ between adjacent optical units.

Figure 17:
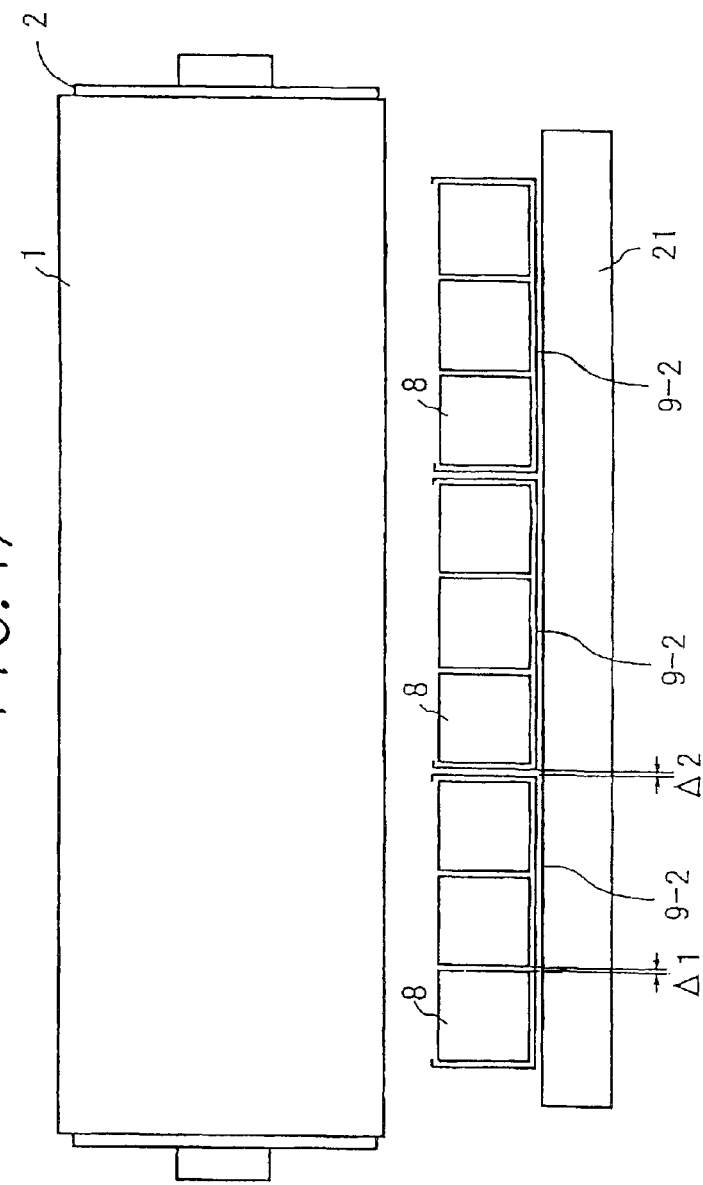
FIG. 17 is a view showing an example of a state in which a plurality of the holders face the drum.

In the example shown in FIG. 17, the optical units 8 are disposed in the holders 9-2 with a gap between adjacent optical units 8, and the holders 9-2 are held on the holding member 20, with the gap $\Delta 2$ between adjacent holders, so as to face the drum 2 holding the recording medium 1.

Figure 18:
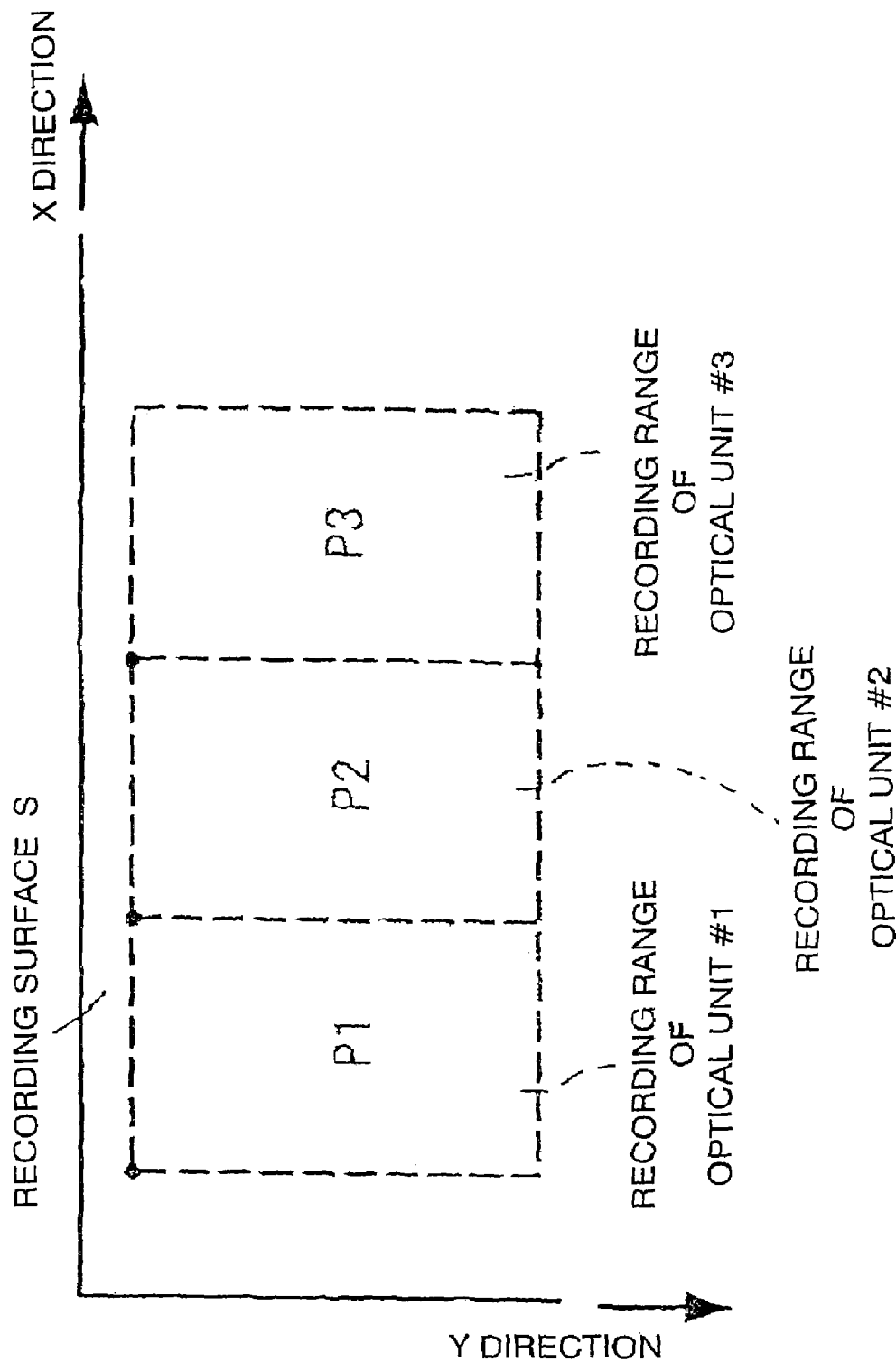
FIG. 18 is a view showing respective ideal recording ranges of three optical units.

The image formation area apportioned width according to the present invention will now be described using FIGS. 18 to 20. FIG. 18 shows the ideal recording ranges of three optical units (a first optical unit #1, a second optical unit #2, and a third optical unit #3) on a recording surface S of a recording medium. The recording range of the first optical unit #1 is denoted by P1, the recording range of the second optical unit #2 is denoted by P2, and the recording range of the third optical unit #3 is denoted by P3. Note that here, the vertical direction (X direction) is the main scanning direction, and the lateral direction (Y direction) is the sub-scanning direction. Further, the term "ideal" means that all of the optical units record an identically sized range. In other words, the image recorded by each optical unit has the same pixel count in both height and width.

In this case, rasterized original image data are divided into the number of optical units and transferred to the respectively corresponding optical units, whereby the original image is reproduced on the recording surface S of the recording medium. However, in an actual optical unit, beam position deviation is generated by a variety of causes, and therefore, when ideal image data are transferred to the optical units, recording such as that shown by the solid lines in FIG. 19, for example, is performed.

Figure 19:
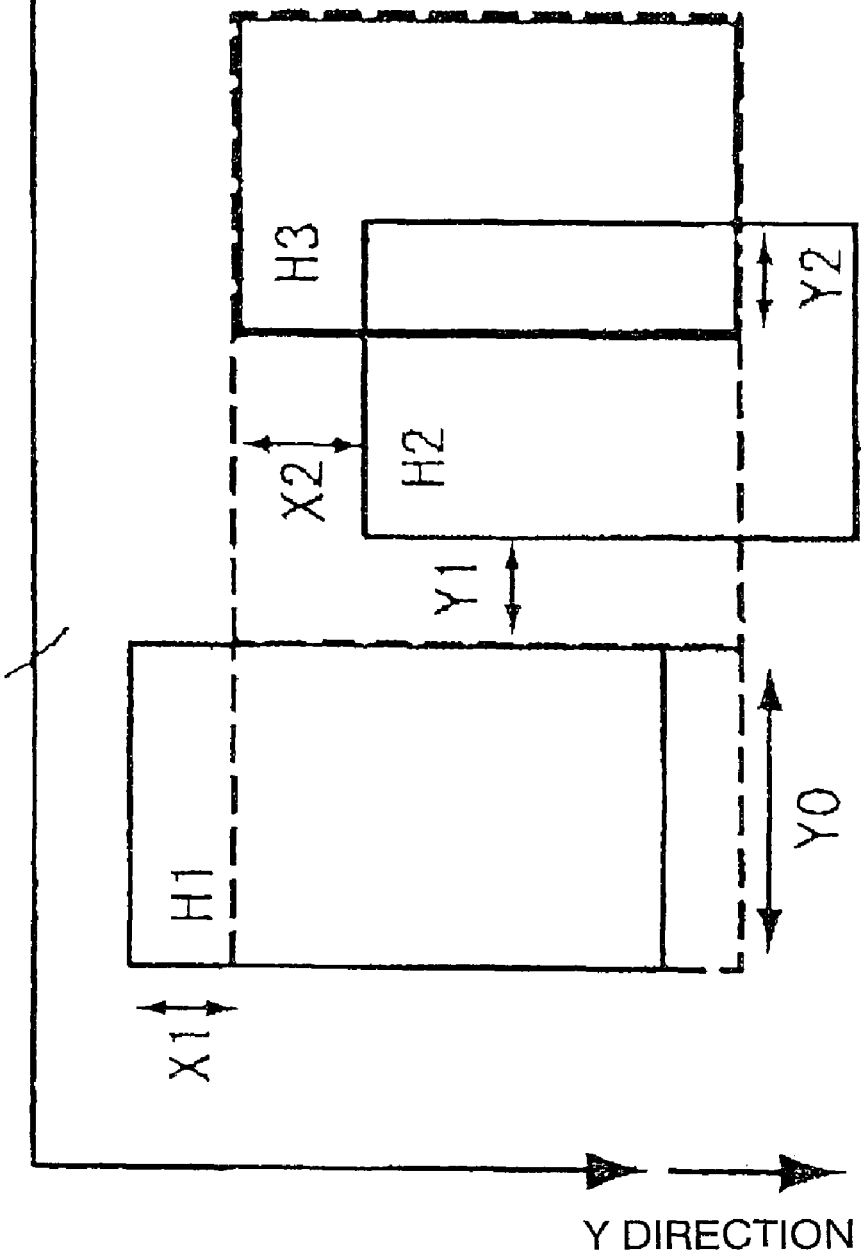
FIG. 19 is a view showing an example in which an actual recording range deviates from the ideal recording range.
Figure 20:
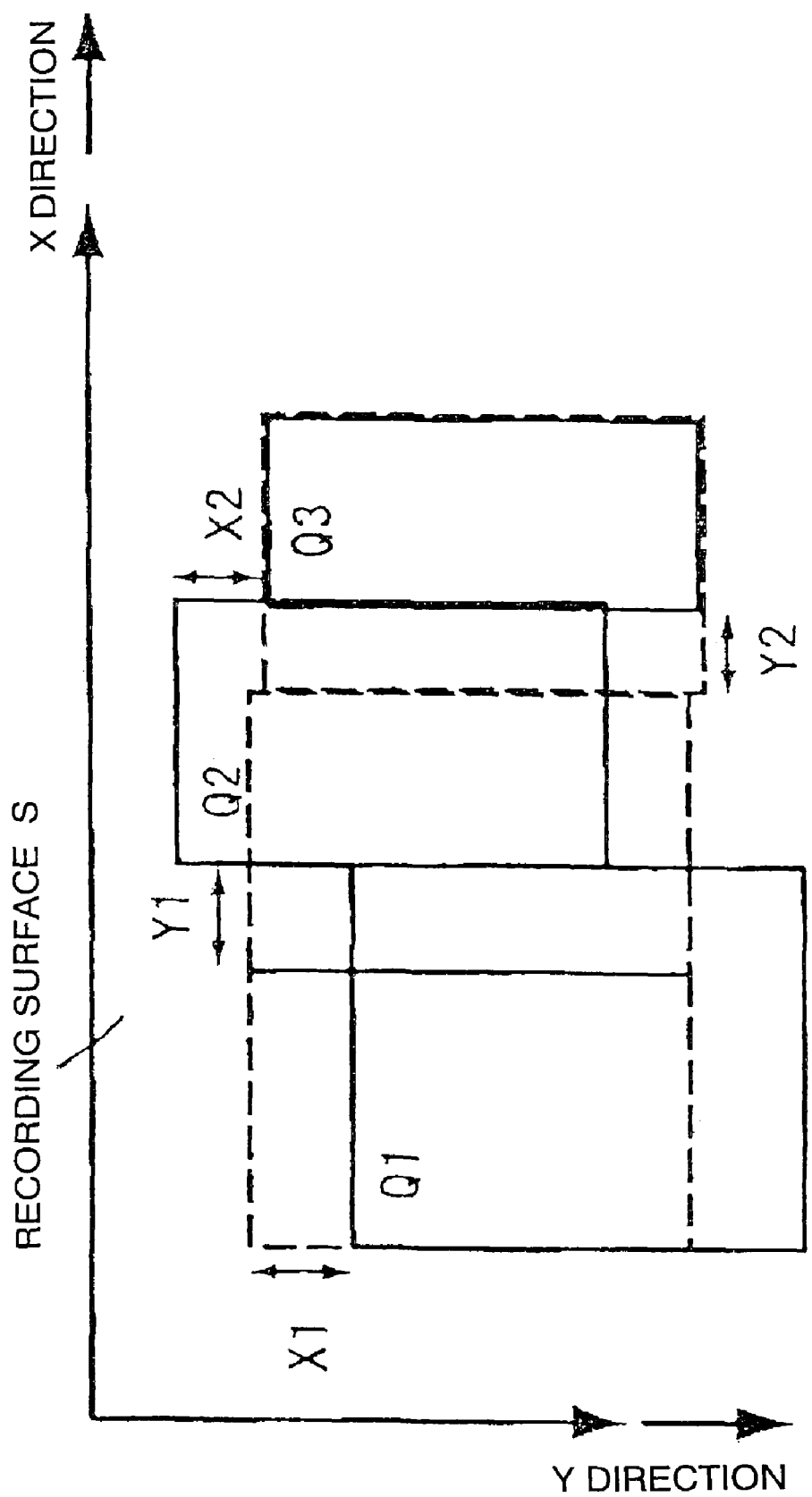
FIG. 20 is a view showing an example of image data that are modified in anticipation of the deviation.

In FIG. 19, a solid line range indicated by the reference symbol H1 is the actual recording range of the first optical unit #1, a solid line range indicated by the reference symbol H2 is the actual recording range of the second optical unit #2, and a solid line range indicated by the reference symbol H3 is the actual recording range of the second optical unit #2. Hence, the first optical unit #1 emits a recording beam earlier than the ideal by X1, while the first optical unit #1$^i$ emits a recording beam later than the ideal by X2 and offset in the sub-scanning direction by Y1. Note that the third optical unit #3 emits a recording beam in the idea recording range.

In the state shown in FIG. 19, a blank space Y1, an overlap Y2, and an irregular upper portion occur on the recorded image. Hence, the blank space Y1 part is set in the recording range of the first optical unit #1, and the image data are modified to the recording ranges shown by the solid lines in FIG. 20, as indicated by the reference symbols Q1, Q2, Q3, such that the first recording head emits a recording beam earlier than the ideal by X1 and the second optical unit #2 emits a recording beam earlier than the ideal by X2. When image data such as that of the recording ranges Q1, Q2, Q3 shown in FIG. 20 are recorded by optical units having characteristics for performing the recording shown in FIG. 19 (note that the recording range of the first optical unit #1 is widened by Y1 and the recording range of the third optical unit #3 is narrowed by Y2), the original image data can be reproduced with no overlap and blank spaces, and in alignment in the Y direction.

Here, the aforementioned image formation area apportioned width indicates the width of an image recorded by the optical unit. The width of the recorded image indicates the maximum image width of the images recorded respectively by the plurality of optical units.

The reasons for this is that at the point in time when the optical unit that is responsible for recording the image having the narrowest width of the original image (in the example shown in FIG. 18, the optical unit #3; in the present invention, the optical unit that is responsible for recording the image having the narrowest width of the original image is denoted simply as the optical unit #3) finishes recording the image width for which it is responsible, the optical unit that is responsible for recording the image having the greatest width of the original image (in the example shown in FIG. 18, the optical unit #1; in the present invention, the optical unit that is responsible for recording the image having the greatest width of the original image is denoted simply as the optical unit #1) has not finished recording the part of the original image for which it is responsible, and therefore it may be assumed that during the period from the point at which the optical unit #3 finishes recording the image for which it is responsible to the time at which the optical unit #1 finishes recording, a blank image is recorded.

Hence, it is assumed that all of the optical units record the same width as the image width recorded by the optical unit responsible for recording the greatest width of the original image, and this width is defined as the image formation area apportioned width. Accordingly, the smallest image formation area apportioned width is the image formation are a apportioned width when the intervals of the beams emitted by the optical units are in an ideal state.

According to the present invention described above, a light source apparatus is formed by installing an optical unit corresponding to a single beam, or a group of these optical units, in a holder, and in so doing, light source apparatuses having various lengths can be formed easily and at low cost. Further, when one light source breaks, low cost replacement can be realized, thereby facilitating maintenance, and since the optical system is simple, the initial cost of the light source apparatus itself can also be suppressed greatly.

Moreover, the optical units or holders are arranged such that a gap is provided between adjacent optical units or holders, and therefore, even when the width of the recording medium in the optical unit array direction is great, an accumulative error in the width direction, caused when a plurality of optical units or a plurality of holders are arranged, does not occur. Hence, the optical units or holders can be disposed with a high degree of precision, and an image forming apparatus having a high degree of optical unit writing position precision, which produces images of a high quality, can be realized.

Various modifications will become possible for those skilled in the art after receiving the teachings of the present disclosure, without departing from the scope thereof.

What is claimed is:

1. An image forming apparatus which uses an optical unit array formed by arranging a plurality of optical units, each of which is formed by incorporating a light source element and a lens for condensing light from the light source element into a casing,
   wherein the optical unit array comprises gaps between the casings of adjacent optical units, and is installed in a holding member such that the optical units can be attached and detached.

2. The image formation area as claimed in claim 1, wherein a casing outer shape width of the optical unit in an array direction is smaller than a width of an image formation area apportioned to each optical unit.

3. The image forming apparatus as claimed in claim 1, wherein a material of the casing of the optical unit is different to a material of the holding member.

4. An image forming apparatus which uses an optical unit array formed by arranging a plurality of optical units, each of which is formed by incorporating a light source element and a lens for condensing light from the light source element into a casing,
   wherein the optical unit array is an optical unit group formed by arranging n number of the optical units in a holder, N number of the optical unit groups are arranged in a holding member so as to cover a width of the image formation area, a gap is provided between the casings of adjacent optical units, and the optical units are installed in the holder detachably (here, n and N are natural numbers of two or more).

5. The image forming apparatus as claimed in claim 4, wherein a casing outer shape width of the optical unit in an array direction is smaller than a width of an image formation area apportioned to each optical unit.

6. The image forming apparatus as claimed in claim 4, wherein the holders carrying the optical unit groups comprise gaps between adjacent holders, and are installed in the holding member detachably.

7. The image forming apparatus as claimed in claim 4, wherein a material of the casing of the optical unit is different to a material of the holding member.

8. The image forming apparatus as claimed in claim 4, wherein a material of the casing of the optical unit is different to a material of the holder.

9. The image forming apparatus as claimed in claim 4, wherein the material of the holder is different to the material of the holding member.

10. The image forming apparatus as claimed in claim 1, wherein the plurality of optical units includes at least three optical units.

* * * * *